(12) United States Patent
Stevens

(10) Patent No.: US 8,459,693 B1
(45) Date of Patent: *Jun. 11, 2013

(54) GAS GENERATOR WITH SUPPORTED SEALING MEMBRANE

(75) Inventor: Bruce A. Stevens, Oakland, MI (US)

(73) Assignee: TK Holdings, Inc., Armada, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/481,613

(22) Filed: May 25, 2012

Related U.S. Application Data

(62) Division of application No. 12/584,105, filed on Aug. 31, 2009, now Pat. No. 8,186,712.

(60) Provisional application No. 61/190,744, filed on Aug. 30, 2008.

(51) Int. Cl.
*B60R 21/26* (2006.01)

(52) U.S. Cl.
USPC .......................................................... 280/737

(58) Field of Classification Search
USPC .......................................................... 280/737
See application file for complete search history.

(56) References Cited

U.S. PATENT DOCUMENTS

| | | | | | |
|---|---|---|---|---|---|
| 5,388,859 | A | * | 2/1995 | Fischer et al. | 280/737 |
| 5,513,572 | A | * | 5/1996 | Frantom et al. | 102/531 |
| 5,536,040 | A | * | 7/1996 | Cuevas et al. | 280/737 |
| 5,580,085 | A | * | 12/1996 | Cuevas et al. | 280/737 |
| 5,601,308 | A | * | 2/1997 | Cuevas | 280/736 |
| 5,613,703 | A | * | 3/1997 | Fischer | 280/737 |
| 5,678,856 | A | * | 10/1997 | Headley | 280/737 |
| 5,709,406 | A | * | 1/1998 | Buchanan | 280/737 |
| 5,762,368 | A | * | 6/1998 | Faigle et al. | 280/737 |
| 5,794,973 | A | * | 8/1998 | O'Loughlin et al. | 280/737 |
| 5,882,036 | A | * | 3/1999 | Moore et al. | 280/736 |
| 6,086,094 | A | * | 7/2000 | Stevens et al. | 280/741 |
| 6,234,522 | B1 | * | 5/2001 | Albrecht et al. | 280/737 |
| 6,786,507 | B2 | * | 9/2004 | Dolling et al. | 280/737 |
| 6,959,649 | B2 | * | 11/2005 | Katsuda et al. | 102/531 |
| 6,966,607 | B2 | * | 11/2005 | Weyhmueller et al. | 297/472 |
| 7,059,633 | B2 | * | 6/2006 | Wang et al. | 280/737 |
| 7,192,052 | B2 | * | 3/2007 | Smith et al. | 280/737 |
| 7,263,929 | B2 | * | 9/2007 | Takahara | 102/202.7 |
| 7,290,796 | B2 | * | 11/2007 | Katsuda et al. | 280/737 |
| 7,401,808 | B2 | * | 7/2008 | Rossbach et al. | 280/737 |
| 7,607,688 | B2 | * | 10/2009 | Kato et al. | 280/737 |
| 8,113,542 | B1 | * | 2/2012 | Stevens et al. | 280/737 |
| 8,186,712 | B1 | * | 5/2012 | Stevens | 280/737 |

* cited by examiner

*Primary Examiner* — Nicole Verley
(74) *Attorney, Agent, or Firm* — L.C. Begin & Associates, PLLC

(57) ABSTRACT

An apparatus is provided for releasably blocking a flow of pressurized fluid through a housing. The apparatus includes a seal member having a rupturable portion, and a support structure configured for supporting the seal member along the rupturable portion so as to substantially prevent outward bulging of the rupturable portion.

11 Claims, 6 Drawing Sheets

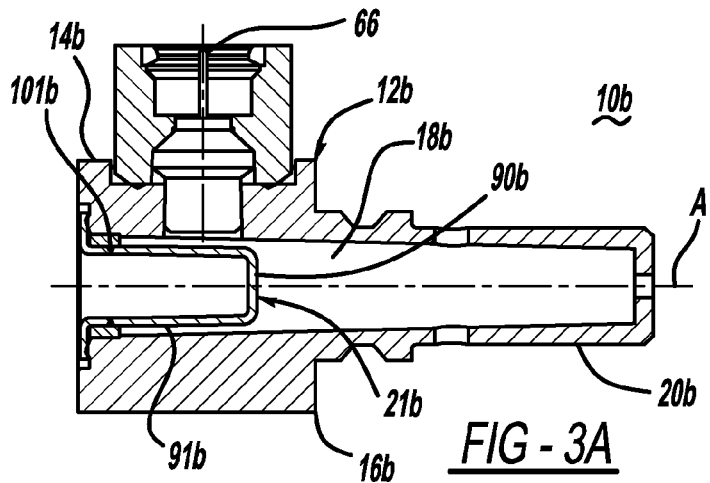
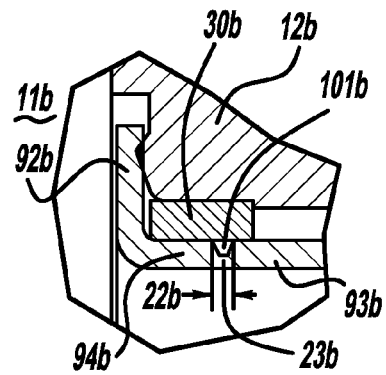
*FIG - 3A*  *FIG - 3B*
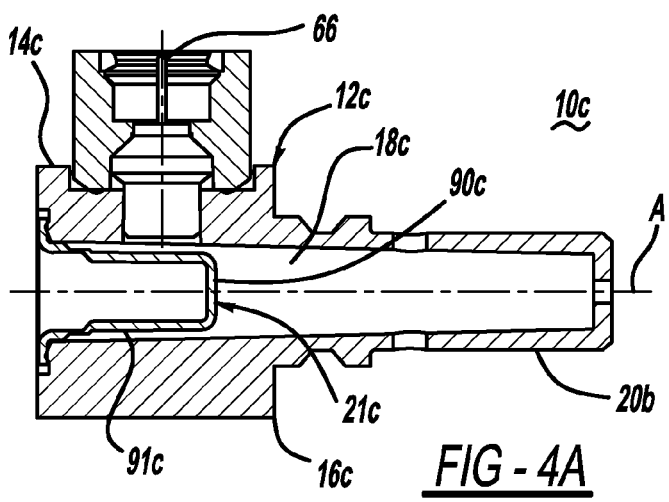
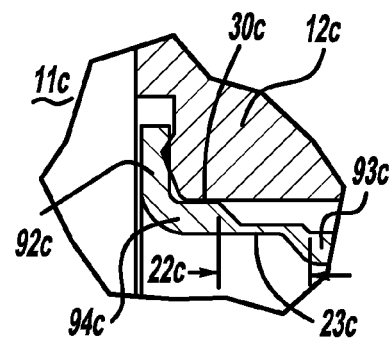
*FIG - 4A*  *FIG - 4B*
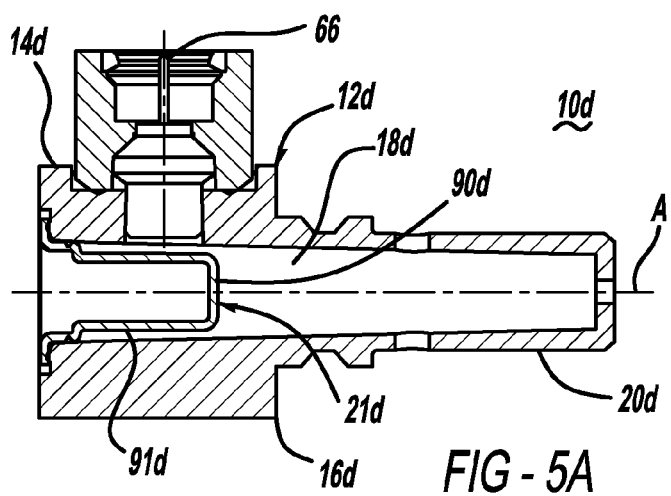
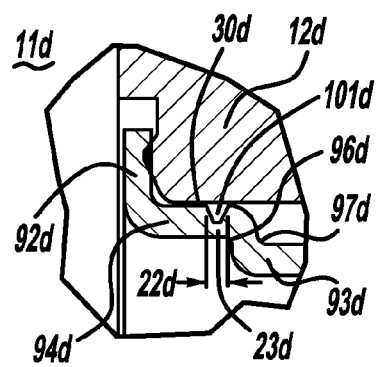
*FIG - 5A*  *FIG - 5B*

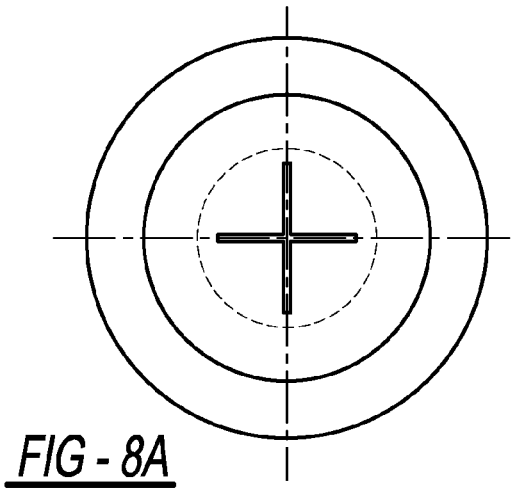
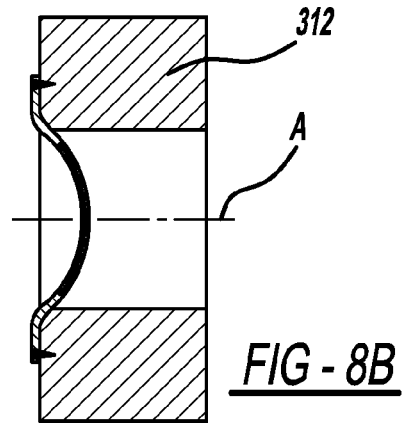
FIG - 8A
FIG - 8B
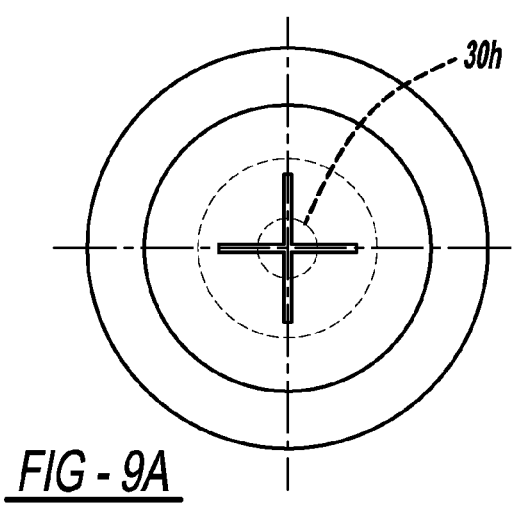
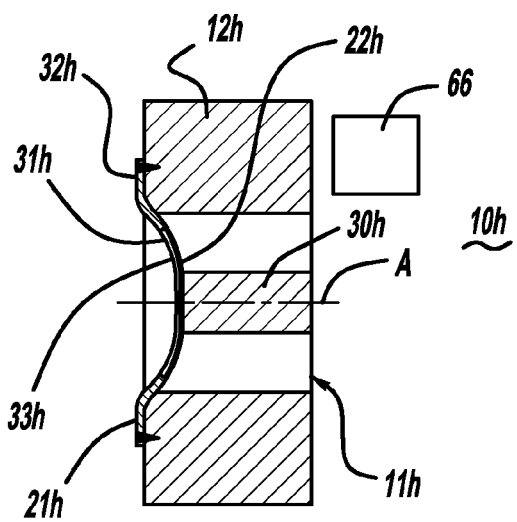
FIG - 9A
FIG - 9B
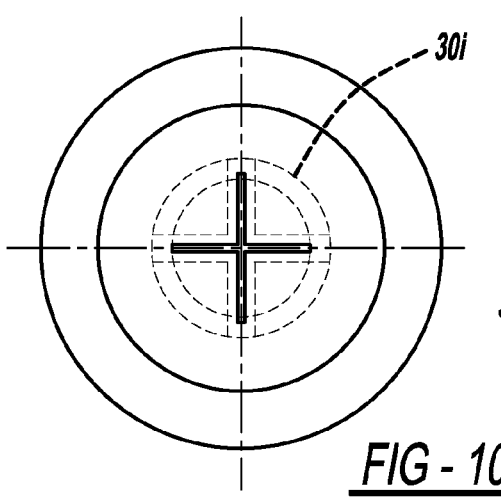
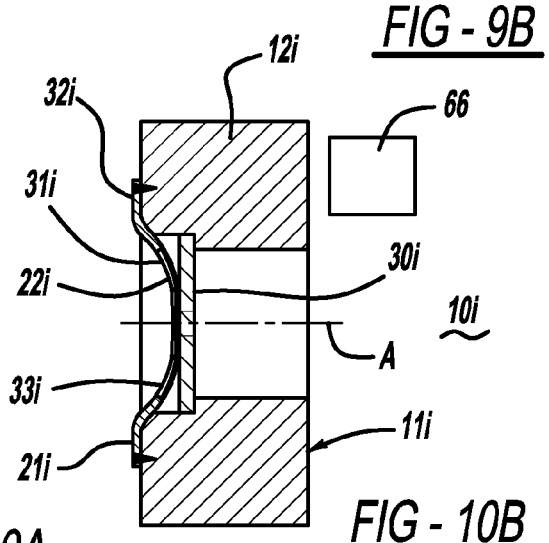
FIG - 10A
FIG - 10B

GAS GENERATOR WITH SUPPORTED SEALING MEMBRANE

CROSS-REFERENCE TO RELATED APPLICATIONS

This application is a divisional of U.S. application Ser. No. 12/584,105, filed on Aug. 31, 2009, now U.S. Pat. No. 8,186,712 which claims the benefit of U.S. Provisional Application No. 61/190,744, filed on Aug. 30, 2008. These prior applications are incorporated herein by reference.

BACKGROUND OF THE INVENTION

The present invention relates to gas sources used for activating gas-actuated devices and, more particularly, to a gas sources incorporating a releasable, pressurized, stored gas component sealed with a rupturable seal.

SUMMARY OF THE INVENTION

In one aspect of embodiments of the present invention, an apparatus is provided including a seal member having a rupturable portion, and a support structure configured for supporting the seal member along the rupturable portion so as to substantially prevent outward bulging of the rupturable portion.

In another aspect of embodiments of the present invention, an apparatus including a pressure-rupturable seal member is provided including a wall defining an interior of the seal member and a notch extending into the wall for facilitating rupture of the wall therealong.

In another aspect of embodiments of the present invention, an apparatus comprising a pressure-rupturable seal member is provided. The seal member includes a rupturable portion, and at least one stiffening portion is operatively coupled to the rupturable portion and configured for substantially preventing outward bulging of the rupturable portion.

In another aspect of embodiments of the present invention, an apparatus is provided including a seal member having a rupturable portion and a support structure configured for supporting the seal member adjacent the rupturable portion so as to substantially prevent outward bulging of the portion of the seal member.

In another aspect of embodiments of the present invention, an apparatus is provided for substantially preventing bulging of a rupturable portion of a seal member due to a pressure on the seal member. The apparatus includes a support structure configured for supporting the seal member along the rupturable portion.

BRIEF DESCRIPTION OF THE DRAWINGS

FIG. 3A is a cross-sectional side view of a mechanism for releasably blocking a flow of pressurized fluid from a container in accordance with another embodiment of the present invention.

FIG. 3B is a magnified view of a portion of the mechanism shown in FIG. 3A.

FIG. 4A is a cross-sectional side view of a mechanism for releasably blocking a flow of pressurized fluid from a container in accordance with another embodiment of the present invention.

FIG. 4B is a magnified view of a portion of the mechanism shown in FIG. 4A.

FIG. 5A is a cross-sectional side view of a mechanism for releasably blocking a flow of pressurized fluid from a container in accordance with an embodiment of the present invention.

FIG. 5B is a magnified view of a portion of the mechanism shown in FIG. 5A.

FIG. 8A is a front view of a mechanism for releasably blocking a flow of pressurized fluid from a container showing an unsupported seal member.

FIG. 8B is a cross-sectional side view of the mechanism of FIG. 8A.

FIG. 9A is a front view of a mechanism for releasably blocking a flow of pressurized fluid from a container including a supported seal member in accordance with another embodiment of the present invention.

FIG. 9B is a cross-sectional schematic side view of the mechanism of FIG. 9A.

FIG. 10A is a front view of a mechanism for releasably blocking a flow of pressurized fluid from a container including a supported seal member in accordance with another embodiment of the present invention.

FIG. 10B is a cross-sectional schematic side view of the mechanism of FIG. 10A.

DETAILED DESCRIPTION

Figure 1A:
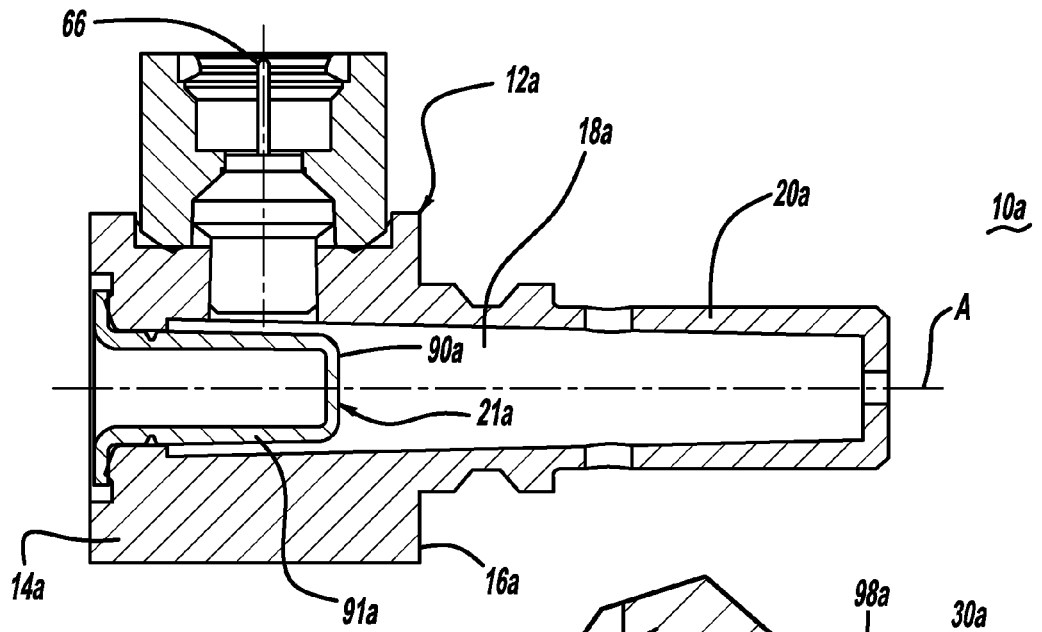
FIG. 1A is a cross-sectional side view of a mechanism for releasably blocking a flow of pressurized fluid from a container in accordance with an embodiment of the present invention.

Similar reference characters denote similar features consistently throughout the attached drawings. In addition, different embodiments of mechanism 10, apparatus 11, and their constituent elements (described below) are denoted by an appropriate suffix applied to the element or embodiment in associated drawing figures. For example, the various embodiments of mechanism 10 are denoted 10a, 10b, 10c, etc., and the various embodiments of seal member 21 are denoted 21a, 21b, 21c, etc.

Figure 1B:
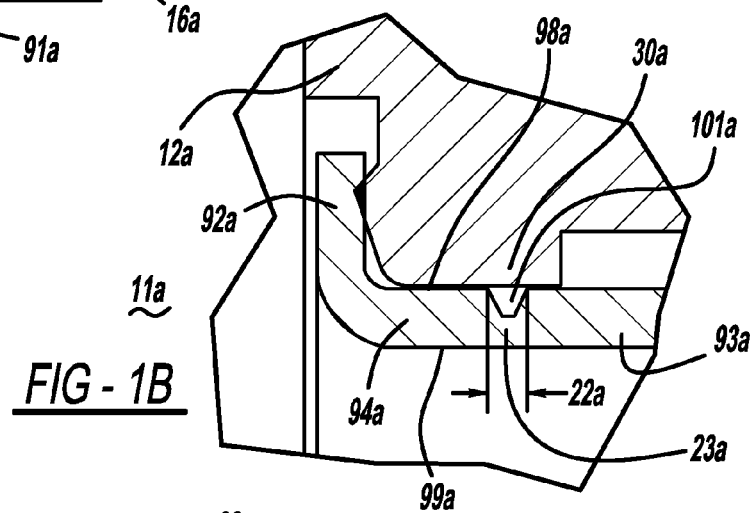
FIG. 1B is a magnified view of a portion of the mechanism shown in FIG. 1A.
Figure 2:
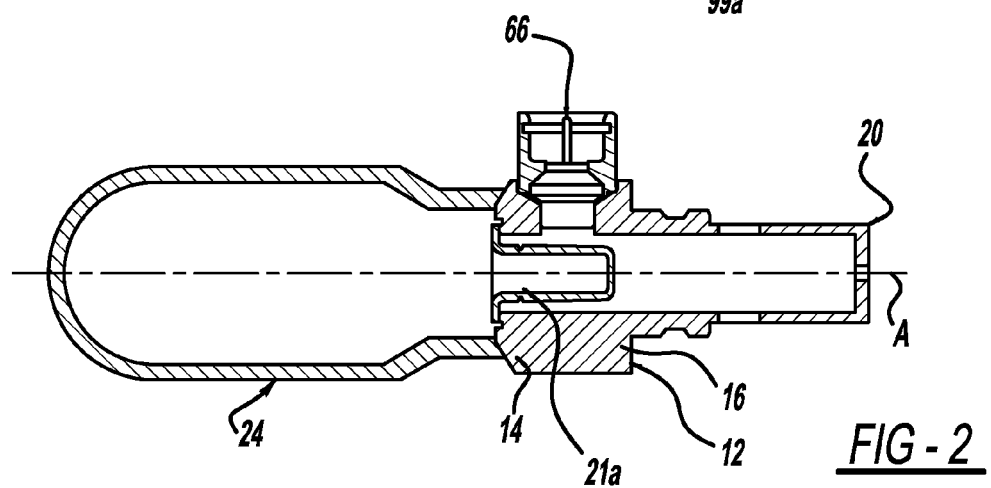
FIG. 2 is a cross-sectional side view of the mechanism of FIGS. 1A and 1B operatively coupled to a container for storing a pressurized fluid.

FIGS. 1-5B, 6B, 6C, 7C, 7D, and 8A-10B show various embodiments of a mechanism 10 for releasably blocking a flow of pressurized fluid from a container, in accordance with the present invention. In FIG. 2, mechanism 10 is shown operatively coupled to a container or bottle 24 for storing a pressurized fluid therein. However, an embodiment of the mechanism may alternatively be operatively coupled to any device from which a pressurized fluid is designed to flow, to releasably block the flow of pressurized fluid. As used herein, the term "releasably blocking" denotes that the apparatus normally blocks flow of the pressurized fluid, but that the portion of the apparatus blocking the fluid flow may be deactivated to release the fluid under certain conditions (for example, by activation of an igniter 66 following activation of a gas generating system into which the apparatus is incorporated, as described herein). In combination, mechanism 10 and container 24 may form a gas source for supplying gas to a gas-actuatable device, for example, an inflatable element in a vehicle occupant protection system. Alternatively, mechanism 10 and container 24 may form a stored gas component incorporated into a gas generating system (for example, a hybrid gas generating system or a hybrid inflator) including a combustible gas generant material.

Referring to the drawings, embodiments of mechanism 10 include an associated housing 12 adapted for receiving the flow of fluid therethrough, and an associated apparatus 11 for blocking the flow of fluid through the housing. Each embodiment of apparatus 11 includes an associated seal member 21 having a rupturable portion 22 formed therealong. In the embodiments shown in the drawings, housing 12 has a first end 14, a second end 16 opposite the first end, and a fluid flow passage 18 extending between ends 14 and 16.

Referring to the drawings, housing 12 includes a hollow diffuser 20 machined or otherwise formed therein, for distributing gases from housing 12 to an airbag or other gas-actuatable device. In an alternative embodiment, diffuser 20 is separately formed from steel or other suitable materials and then welded or otherwise fixed to housing second end 16.

Seal member 21 is in fluid communication with an interior of bottle 24 and is exposed to pressurized fluid contained in the bottle. Seal member 21 is adhered, welded or otherwise affixed to housing 12 or another element of the gas source proximate an opening of bottle 24 to form a fluid-tight barrier preventing flow of pressurized gas through or around the seal member. Seal member 21 may be cup shaped as shown in FIGS. 1-7D, the seal member may have a concave configuration as shown in FIGS. 8A-10B, or the seal member may have any of a variety of other configurations as known in the art.

Each embodiment of the seal member 21 described herein incorporates a rupturable portion, generally designated 22, including one or more circumferential stress-risers 23 formed thereon. The stress-riser 23 defines a region along which the rupturable portion ruptures to release the pressurized gas from the bottle, when the gas source is activated and the seal member is ruptured. The stress-riser 23 may be in the form of a score or notch which is coined, embossed, or otherwise formed in the seal member during fabrication. Alternatively, the stress-riser may be in the form of a portion of the seal member having a reduced cross-sectional area. As understood herein, the term "portion" is understood to designate a selected part or parts of (but not all of) the element to which it refers. As used herein, the term "rupturable portion" is understood to refer to a portion of the seal member that is designed to rupture under predetermined conditions, in contrast to remaining portions of the seal member which are designed to remain intact during rupture of the rupturable portion.

In general, the rupturable portion will have a reduced cross-sectional area or other stress-riser designed in and formed therealong to facilitate rupture at a desired location on the seal member. As used herein, the "rupturable portion" of the seal member is also understood to encompass any portion of the seal including a reduced cross-sectional area or other stress-riser. Examples of rupturable seal portions in accordance with the embodiments of the present invention are shown in FIGS. 1B and 4B as regions 22a and 22c, respectively. After activation of the gas source, the seal member will tend to break along the relatively thinner wall section of the stress-riser before breaking along other portions of the seal. Therefore, this thinner wall section defines a circumferential break region along which the rupturable portion ruptures to release the pressurized fluid from the bottle when the rupturable portion is stressed as described below.

The various embodiments of seal member 21 may be stamped, molded, or otherwise formed from a metallic, polymeric, or other material into which the desired stress-riser may be formed and which possesses the strength necessary to resist the forces exerted on the member by the compressed gas stored in bottle 24 prior to activation of the gas source. The materials and structural details of the seal member will depend on such factors as the pressure of the gas sealed in bottle 24, the desired configuration of the stress-riser, and the desired performance characteristics of a gas source into which mechanism 10 is incorporated. For example, seal members made from materials and/or having structures which are more or less readily ruptured may be used.

A device capable of generating at least a predetermined minimum force suitable for rupturing seal member 21 is mounted to the housing so as to permit fluid communication with the seal member 21 upon activation of the gas source. Suitable force-generating devices include explosively actuated projectiles or pin pokers, and any devices capable of supplying a gas jet or shock front, for example initiators, gas generators and detonators. In the embodiments shown in the drawings, a known initiator or squib 66 is crimped or otherwise suitably secured to a periphery of housing 12 and extends through a wall of the housing so that, upon activation of the initiator 66, fluid communication between seal member 21 and the initiator is enabled. One exemplary initiator construction is described in U.S. Pat. No. 6,009,809, herein incorporated by reference.

Prior to activation of the gas source, seal member 21 is in fluid communication with and under pressure from the pressurized fluid stored in bottle 24. The seal member 21 is configured and dimensioned such that exposure to pressure differentials resulting from activation of the gas source and any associated mechanism such as initiator 66 designed to ensure timely seal member rupture produce rupturing of the seal member and release of the stored gas.

In some applications, it is also desirable to configure and dimension the seal member so as to ensure rupture of the seal member upon occurrence of a predetermined minimum elevated temperature condition in the stored gas. That is, it is desirable to ensure that the seal member will rupture when or after (but not before) the gas stored in the bottle 24 reaches a predetermined elevated temperature. In one particular example, the predetermined elevated temperature is 130° C. This threshold elevated temperature effectively defines an associated rupture pressure for the seal member, for a given seal member design, bottle volume, and number of moles of stored gas. This ensures venting of the stored gas from the bottle 24 at or near the desired rupture pressure when the gas bottle is exposed to elevated external temperatures.

Figure 6A:
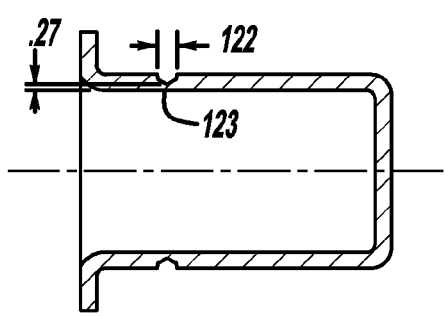
FIG. 6A is a cross-sectional side view of sample of an exemplary seal member.
Figure 6B:
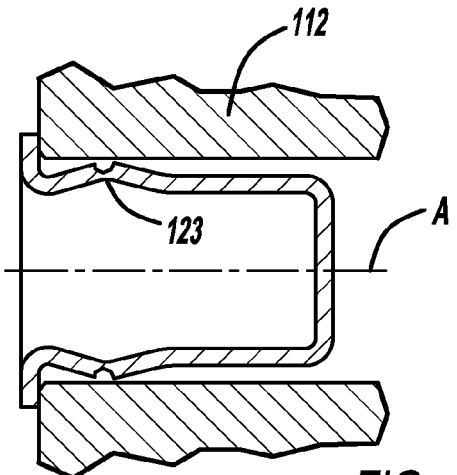
FIG. 6B shows the seal member of FIG. 6A positioned in a housing without a support structure as described herein.
Figure 7A:
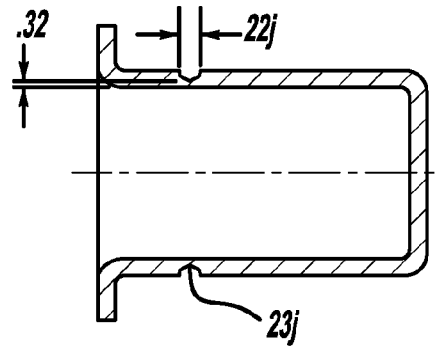
FIG. 7A is a cross-sectional side view of sample of another exemplary seal member.
Figure 7B:
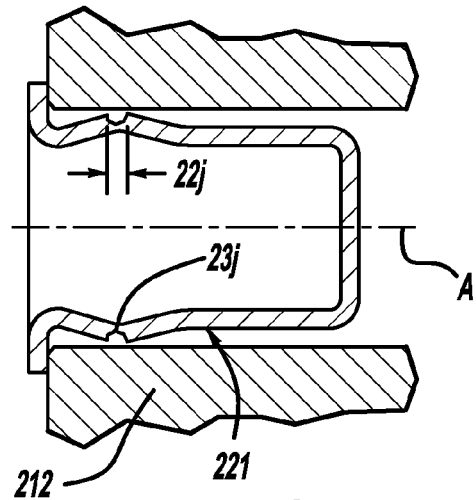
FIG. 7B shows the seal member of FIG. 7A positioned in a housing without a support structure as described herein.

At elevated gas pressures resulting from elevated bottle temperatures, the seal member may bulge outwardly proximate the stress-riser as shown in FIGS. 6B and 7B, causing the seal member material at the stress riser to stretch and thin. If the material at the stress riser as fabricated is already relatively thin, further stretching of the material due to elevated pressure may reduce the material thickness to the point where the pressure at which the seal member will rupture is effectively lowered. This may cause the seal member to rupture prematurely, before the temperature corresponding to the desired burst pressure has been reached.

However, in some of the applications previously mentioned, rupturing of the seal member by an initiator or other gas source activation mechanism must also be reliably enabled at external system temperatures as low as −40° C. At these lower temperatures, the stored gas is at a relatively low pressure. As a result, the material of the stress riser is substantially unstretched by the gas pressure. Due to these factors, the stress riser is relatively more difficult to rupture at the lower temperatures because the gas pressure and stresses in the material are much less conducive to rupturing of the seal member. If the material at the stress riser is made relatively thicker to compensate for stretching of the material due to bulging at high temperatures, the stress riser may become even more difficult to rupture at the lower temperatures, to a point where the seal member may fail to rupture precisely when desired.

To enable the use of a relatively thinner material thickness at the stress-riser while preventing premature rupture of the seal member at higher temperatures, particular embodiments of the apparatus 11 for blocking the flow of fluid include a seal member having rupturable portion 22 and a support structure, generally designated 30, configured for supporting the seal member along the rupturable portion so as to substantially prevent outward bulging of the portion of the seal member. As used herein, the term "outward bulging" is understood to refer to bulging of a portion of the seal member in a general direction in which fluid would tend to flow if escaping the seal member at the bulged portion. A support structure is configured for supporting the seal member "along" the rupturable portion when the support structure overlies or abuts all or a part of the rupturable portion along an exterior of the seal member, as shown in FIGS. 1-3, 5, 6B, 6C, 7C, 7D, 9A, 9B, 10A and 10B. A support structure is configured for supporting the seal member "adjacent" the rupturable portion when the support structure overlies or abuts a portion of the seal member either close to the rupturable portion or in contact with the rupturable portion. Thus, in certain embodiments, a support structure may be configured to support the seal member both adjacent the rupturable portion and along the rupturable portion (for example, in the embodiments shown in FIGS. 1A-1B and 3A-3B).

The support structure may be formed in any of a variety of ways. For example, the support structure may be formed as part of a housing in which the seal member is positioned, using any of a variety of known methods depending on the configuration of the housing and the materials from which it is fabricated. Alternatively, the support structure may be formed separately from the housing and positioned in the housing to perform the desired support function. Alternatively, the support structure may be formed into the structure of the seal member, using any of a variety of known methods depending on the configuration of the seal member and the materials from which it is fabricated.

As used herein with regard to support structures located exterior of the seal member, the term "substantially prevent" is understood to mean that the support structure is configured and located with respect to the supported portion of the seal member so as to limit outward bulging of the supported portion, to a distance (if any) between the support structure and the supported portion of the seal member. Where it exists, this distance is generally provided as a clearance for assembly purposes. Thus, in some embodiments, the support structure may not engage the seal member along or adjacent to the rupturable portion until a limited amount of seal member expansion (i.e., enough expansion to occupy any clearance space) occurs due to elevated pressure.

Embodiments of the present invention are directed to substantially preventing an outward bulging of the rupturable portion of the seal member due to an internal pressure within the seal member. As used herein, the term, "outward bulging" is understood to denote an outwardly-directed swelling or protrusion of a portion of the seal member beyond a boundary defined by an exterior surface of the seal member as fabricated, when there is no pressure differential across the seal member. In general, the seal member is also configured such that when exposed to pressurized gas in a gas bottle that is at temperature within a normal operating temperature range prescribed for the bottle in its particular application, the rupturable portion is in an "unbulged" condition. This is because the pressure exerted by the stored fluid on the rupturable portion when the bottle is within the normal operating temperature range is insufficient to produce a bulge in the wall of the rupturable portion as described herein.

Also, the term "elevated pressure" as used herein refers to a pressure that is higher than a pressure of the stored fluid when the temperature of the vessel containing the fluid is within a normal operating temperature range prescribed for the vessel in its particular application.

It has been discovered that providing a support structure adjacent and/or along the rupturable portion of the seal member substantially prevents outward bulging of the rupturable portion due to pressurization of the seal member.

It has also been discovered that the thickness of the seal member wall along the rupturable portion may be reduced when a support structure in accordance with an embodiment of the present invention is incorporated into mechanism 10 to aid in preventing bulging of the seal member. It has been discovered that a consistent, predictable burst pressure may be achieved for an elevated temperature condition using a relatively thinner stress-riser thickness, which also facilitates consistent rupture of the seal member at the lower end of the operating temperature range of the system.

It has also been discovered that configuring the support structure for supporting the seal member adjacent either side of the rupturable portion for a certain distance (rather than ending the support structure at a point along the rupturable portion) even further reduces any tendency of the rupturable portion to bulge at the stress-riser, thereby further increasing the effective strength of the seal member at the stress-riser. Thus, it appears that the burst pressure for a given seal member design may be effectively "tuned" to a degree by varying the extent of the support structure in relation to the rupturable portion. That is, a burst pressure within a predetermined range may be achieved by providing a support structure configured to support a portion of the seal member adjacent the rupturable portion along an associated length of the seal member measured from the rupturable portion. The overall length of the portion of the seal member to be supported in order to achieve a burst pressure within the predetermined range for a given seal member design may be determined iteratively using known methods.

In embodiments of the present invention, the rupturable portion 22 of the seal member 21 has a cross-sectional area less than a cross-sectional area of any portion of the seal member adjacent the rupturable portion.

In several embodiments (shown in FIGS. 1-3, 5, 6B, 6C, 7C, 7D, 9A, 9B, 10A and 10B), the support structure 30 supports at least part of the seal member rupturable portion 22. A support structure as described herein is understood to support at least part of the rupturable portion when the support structure overlies or abuts all or a part of the rupturable portion along an exterior of the seal member.

In several embodiments (shown in FIGS. 1A, 1B, 3A, 3B, 4A, 4B, 5A, 5B, 6B, 6C, 7C, and 7D, the seal member 21 extends along an axis A, and the support structure 30 is positioned to substantially prevent outward bulging of the portion of the seal member in a direction substantially transverse to the axis.

In several embodiments (shown, for example, in FIGS. 9A, 9B, 10A and 10B), the seal member 21 extends along an axis A, and the support structure 30 is positioned to substantially prevent outward bulging of a portion of the seal member along the axis.

In several embodiments (shown in FIGS. 1A, 1B, 4A, 4B, 5A, and 5B), the seal member 21 extends along a passage 18 formed in housing 12 and the support structure 30 is formed by a portion of the housing 12.

In several embodiments (shown in FIGS. 3A and 3B), the seal member 21 extends along a passage 18 formed in housing 12 and the support structure is formed by a bracing member 30b interposed between the seal member 21 and a wall of the passage. Bracing member 30b may be an insert (for example, an annular ring) positioned and secured within the housing so as to provide the desired support of seal member 21b. the insert may be formed from any suitable material, using any suitable process.

In several embodiments (shown in FIGS. 1A, 1B, 3A, 3B, 4A, 4B, 5A, 5B, 6B, 6C, 7C and 7D), the seal member 21 includes a base 90, a wall 91 extending from a circumference of the base 90, and a flange 92 extending from a circumference of the wall. In addition, the wall 91 includes the rupturable portion 22, a second wall portion 93 extending between the rupturable portion 22 and the base 90, and a third wall portion 94 extending between the rupturable portion 22 and the flange 92.

In at least one embodiment (an example of which is shown in FIGS. 4A & 4B), the wall second portion 93 is spaced apart from the support structure.

In at least one embodiment (an example of which is shown in FIGS. 5A and 5B), a first bend 96d is formed in the second wall portion 93d adjacent the rupturable portion 22d for stiffening the second wall portion adjacent the rupturable portion to substantially prevent outward bulging of the second wall portion adjacent the rupturable portion, and a second bend 97d is formed in the second wall portion 94d adjacent the first bend 96d. In this embodiment, the support structure comprises a part of the second wall portion 93d adjacent rupturable portion 22d and encompassing the first bend 96d. In addition, the rupturable portion 22d may be positioned so as to control the length of the third wall portion 94d. It is believed that shortening third wall portion 94d contributes to the stiffness of the wall adjacent the rupturable portion 22d. It is also believed that second wall portion 93d adjacent the rupturable portion 22d imparts a substantial stiffness to rupturable portion 22d due to such factors as the bends formed in the wall and the relatively short spacing between the rupturable portion 22d and the first bend 96d.

In another embodiment (shown in FIGS. 5A and 5B), a stiffening bend is formed in second wall portion 93d adjacent rupturable portion 22d. It is believed that this bend supports the rupturable portion 22d to aid in preventing bulging of the rupturable portion.

In several embodiments (shown in FIGS. 1A, 1B, 3A, 3B, 4A, 4B, 5A, 5B, 6B, 6C, 7C and 7D), the support structure 30 is positioned for supporting the wall third portion 94.

In several embodiments (examples of which are shown in FIGS. 1A, 1B, 3A, 3B, 5A, 5B, 6C and 7D), the support structure 30 is positioned for supporting the wall second portion 93 adjacent the rupturable portion 22.

Figure 6C:
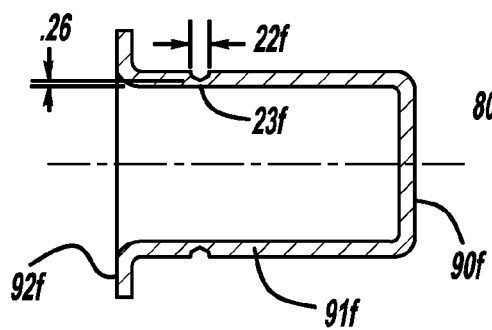
FIG. 6C is a cross-sectional side view of sample of another exemplary seal member.
Figure 6D:
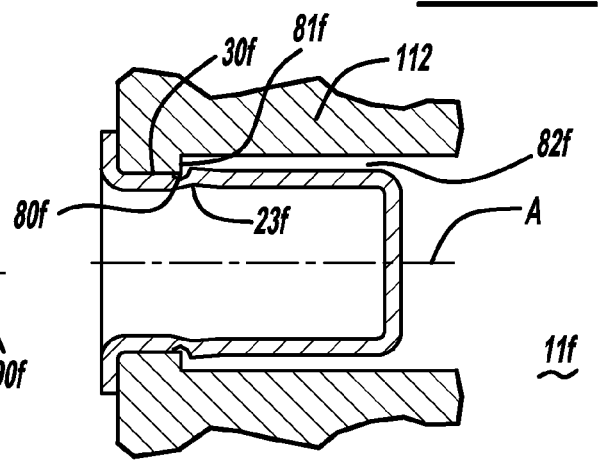
FIG. 6D shows the seal member of FIG. 6C positioned in a housing with a support structure as described herein having a first predetermined length.
Figure 7C:
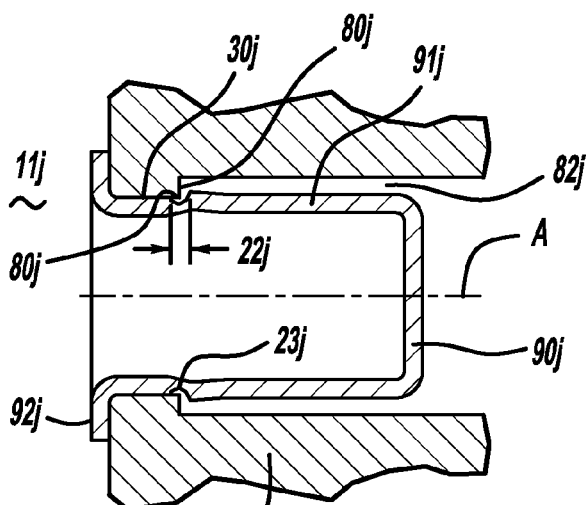
FIG. 7C shows the seal member of FIG. 7A positioned in a housing with a support structure as described herein having a third predetermined length.

In at least two embodiments (examples of which are shown in FIGS. 6D and 7C), apparatus 11 also includes an edge (labeled 80f in FIG. 6D and 80j in FIG. 7C) of the support structure positioned opposite the rupturable portion 22 to define an associated recess (labeled 81f in FIG. 6D and 80k in FIG. 7C) opposite the rupturable portion 22 and the wall second portion 93. In these embodiments, each shoulder edge is positioned such that a pressure within a predetermined range acting on the interior of the seal member 21 produces a deformation of the wall second portion 93 toward a respective one of recesses 81f and 80k, thereby producing engagement between the rupturable portion and the edge sufficient to rupture the seal member 21 along the rupturable portion 22.

In several embodiments (examples of which are shown in FIGS. 4A, 4B, 5A, and 5B), wall second portion 93 is spaced apart from the support structure 30.

In the embodiments shown in FIGS. 4A, 4B, 5A, and 5B, a pressure within predetermined range acting on the seal member 22 produces a deformation of the wall second portion 93 toward the support structure 30 to rupture the wall 91 along the rupturable portion 22.

Referring to FIG. 2, in another aspect of the embodiments of the present invention, a gas generating system 70 is provided including a container 24 for storing a fluid under pressure and an apparatus 11 in accordance with an embodiment described herein operatively coupled to the container for releasably blocking a flow of pressurized fluid from the container.

In another aspect of the embodiments of the present invention, as seen in FIGS. 5A & 5B, a pressure-rupturable seal member 21d is provided including a rupturable portion 22d and at least one stiffening portion 97d operatively coupled to the rupturable portion 22d and configured for substantially preventing outward bulging of the rupturable portion. In the embodiment shown in FIGS. 5A & 5B, the stiffening portion (s) includes bend 96d formed in wall 91d of seal member 21d.

In several embodiments (examples of which are shown in FIGS. 1A, 1B, 3A, 3B, 5A, 5B, 6B, 6C, 7C, and 7D), pressure-rupturable seal member 21 in accordance with embodiments of the present invention includes a wall 91 defining an interior of the seal member, the wall having an interior surface 99, an exterior surface 98, and a notch 101 extending into the wall for facilitating rupture of the wall therealong.

In particular embodiments (shown in FIGS. 1A, 1B, 3A, 3B, 5A, 5B, 6B, 6C, 7C and 7D), the notch 101 extends into the wall 91 from the exterior surface 98 toward the interior surface 99. In other particular embodiments (not shown), the notch 101 extends into the wall 91 from the interior surface 99 toward the exterior surface 98.

In at least one embodiment (an example of which is shown in FIGS. 4A and 4B), an apparatus in accordance with embodiments of the present invention includes a seal member 21 including a rupturable portion 22, and a support structure 30 configured for supporting the seal member 21 adjacent the rupturable portion 22 so as to substantially prevent outward bulging of the rupturable portion. It is believed that support of the seal member adjacent the rupturable portion, along one or more sides of the rupturable portion, constrains deflection of the rupturable portion so as to substantially prevent the bulging described herein.

Thus, it appears that the thickness of the seal member wall along the rupturable portion may be reduced when a support structure in accordance with an embodiment of the present invention is incorporated into mechanism 10 to aid in preventing bulging of the seal member. It has been discovered that a consistent, predictable burst pressure may be achieved for an elevated temperature condition using a relatively thinner stress-riser thickness, which also facilitates consistent rupture of the seal member at the lower end of the operating temperature range of the system.

EXAMPLE 1

FIGS. 6A-6F illustrate representative examples of the findings set forth above. FIGS. 6A-6B show a seal member 121 having a rupturable portion 122 including a stress-riser 123 with a thickness of 0.27 inches. Seal member 121 was positioned within a housing cavity without a support structure as described herein. The seal member was exposed to an elevated internal pressure which produced an outward bulging as shown in the right portion of the figure. The burst pressure of seal member 121 along the rupturable portion at 23° C. was determined to be approximately 105 MPa.

FIGS. 6C-6D show a seal member 21f having a rupturable portion 22f including a stress-riser 23f with a thickness of 0.26 inches. Seal member 21f was positioned within a housing cavity that includes a support structure 30f formed thereon, in accordance with an embodiment of the present invention. As the seal member was exposed to an elevated internal pressure, support structure 30f substantially prevented the outward bulging and stretching of the stress-riser 23 shown in FIG. 6B. The burst pressure of seal member 21f along the relatively thinner rupturable portion at 23° C. was also determined to be approximately 105 MPa.

Figure 6E:
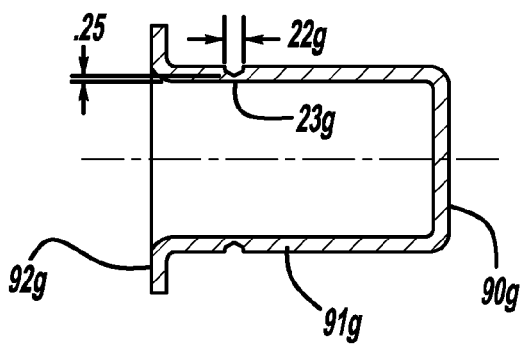
FIG. 6E is a cross-sectional side view of sample of another exemplary seal member.
Figure 6F:
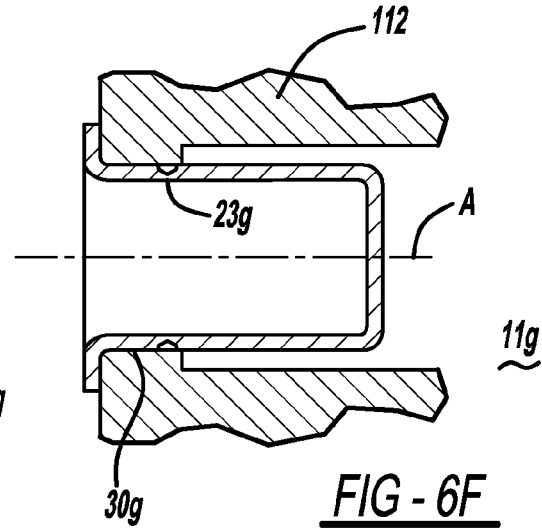
FIG. 6F shows the seal member of FIG. 6E positioned in a housing with a support structure as described herein having a second predetermined length different from the first predetermined length.

FIGS. 6E-6F show a seal member 21g having a rupturable portion 22g including a stress-riser 23g with a thickness of 0.25 inches. Seal member 21g was positioned within a housing cavity that includes a support structure 30g formed thereon, in accordance with an embodiment of the present invention. As the seal member is exposed to an elevated internal pressure, support structure 30g substantially prevents the outward bulging shown in FIG. 6B. The burst pressure of seal member 21g along the still thinner rupturable portion at 23° C. was also determined to be approximately 105 MPa.

Thus, it appears that the thickness of the seal member wall along the rupturable portion may be reduced when a support structure in accordance with an embodiment of the present invention is incorporated into mechanism 10 to aid in preventing bulging of the seal member. Thus, it appears that a consistent, predictable burst pressure may be achieved for an elevated temperature condition using a relatively thinner stress-riser thickness, which also facilitates consistent rupture of the seal member at the lower end of the operating temperature range of the system.

EXAMPLE 2

Referring to FIGS. 7A-7D, in another example, a seal member having a stress-riser with a thickness of 0.32 inches was positioned within housings incorporating different embodiments of support structures in accordance with the present invention.

In FIG. 7B, a seal member 221 was positioned in a cavity of a housing 212 lacking a support structure as described herein. The seal member 221 was exposed to an elevated internal pressure which produced an outward bulging as shown in the figure. The burst pressure of seal member 221 along the rupturable portion at 23° C. was determined to be approximately 125.8 MPa.

In FIG. 7C, a seal member 221 having the same configuration as shown in FIG. 7A was positioned in a cavity of a housing 212 incorporating a support structure which ended proximate the stress-riser 23. The seal member 221 was then exposed to an elevated internal pressure. The support structure substantially prevented the outward bulging shown in FIG. 7B, thereby preventing the stretching and relative weakening of the seal member 221 along the stress riser. This use of the support member effectively increased the burst pressure to approximately 131.2 MPa.

Figure 7D:
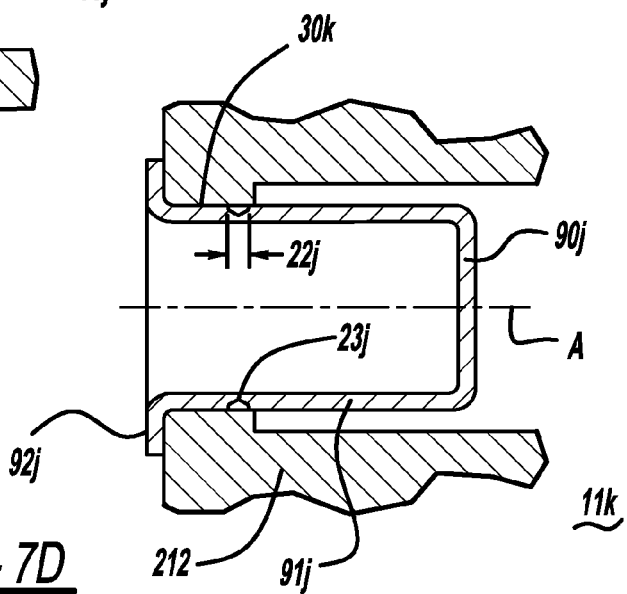
FIG. 7D shows the seal member of FIG. 7A positioned in a housing with a support structure as described herein having a fourth predetermined length different from the third predetermined length.

In FIG. 7D, a seal member 221 having the same configuration as shown in FIG. 7A was positioned in a cavity of a housing 212 incorporating a support structure which extended completely past the rupturable portion of the seal member.

The seal member 221 was then exposed to an elevated internal pressure. The support structure substantially prevented the outward bulging shown in FIG. 7B, thereby preventing the stretching and relative weakening of the seal member 221 along the stress riser. This use of the support member effectively increased the burst pressure to approximately 136.4 MPa.

It is believed that extending the support structure for a distance in either direction past the rupturable portion (rather than ending the support structure at a point along the rupturable portion) even further reduced any tendency of the rupturable portion to bulge at the stress-riser, further increasing the effective strength of the seal member at the stress-riser. Thus, it appears that the burst pressure for a given seal member design may be effectively "tuned" to a degree by varying the extent of the support structure in relation to the rupturable portion.

Normal operation of the embodiments shown in FIGS. 1-7D is as follows. Upon occurrence of a crash event, the igniter 66 is activated by a signal received from a crash sensor or accelerometer (not shown). When the igniter is fired, the interior of housing 12 is pressurized. Pressure generated by activation of the initiator acts on seal member 21, applying a load on the seal member which induces an axial tensile load in the seal member wall 91. The combination of the stress induced by the bottle gas pressure and the stress induced by the load on the seal member exceeds the break strength of the relatively thinner rupturable portion 22 of the seal member. The seal member ruptures along the rupturable portion 22, thereby releasing the gas. Stored pressurized fluid within bottle 24 then flows through the ruptured seal member and through housing 12, into diffuser 20, and out of the diffuser through orifices 54 and into an airbag or other inflatable element (not shown). A filter (not shown) may be positioned in diffuser 20 to trap by-products of initiator activation, portions of the seal member, or other debris within the diffuser to prevent their entry into the airbag.

In the embodiments shown in FIGS. 1-7D, the wall thickness of the rupturable portion 22 affects the pressure at which the seal member will burst. The burst strength of the rupturable portion is greater than the stress induced by the compressed gas in the bottle, but lower than the combined stress produced by the compressed gas and the forces on the seal member resulting from activation of the igniter. The breaking strength of the rupturable portion is also less than the pressure inside the bottle needed to rupture the bottle. This provides a safe gas relief mechanism for over-pressurization situations caused by, for example, a fire external to the gas bottle.

In other embodiments (examples shown in FIGS. 9A-10B), an apparatus in accordance with embodiments of the present invention includes a seal member 21 having a concave portion 31 and a circumference 32 along a periphery of the concave portion 31. The rupturable portion 22 is formed along the concave portion 31, and the support structure 30 supports the seal member along the concave portion 31. In the embodiments shown in FIGS. 9A, 9B, 10A and 10B, stress-riser 23 is in the form of a cross-shaped groove or score formed proximate the center of the seal member. Support structure 30 is positioned to support the seal member along the rupturable portion proximate the center of the seal member. This reduces the unsupported length of the rupturable portion of the seal member, reducing the probability of bulging and rupture of the seal member due to an elevated pressure condition within bottle 24 as previously described.

In normal operation of the embodiments shown in FIGS. 9A, 9B, 10A and 10B, pressure created by activation of igniter 66 displaces, fractures, or otherwise disables the support structure 30, so that the support structure no longer supports a portion of seal member 21. This effectively doubles the unsupported length of the rupturable portion, enabling rupture of the rupturable portion by the forces produced by the squib and the stored gases as previously described.

In another aspect of the present invention, an apparatus is provided for substantially preventing bulging of a rupturable portion of a seal member due to a pressure on the seal member. The apparatus includes a support structure configured for supporting the seal member along the rupturable portion.

Figure 11:
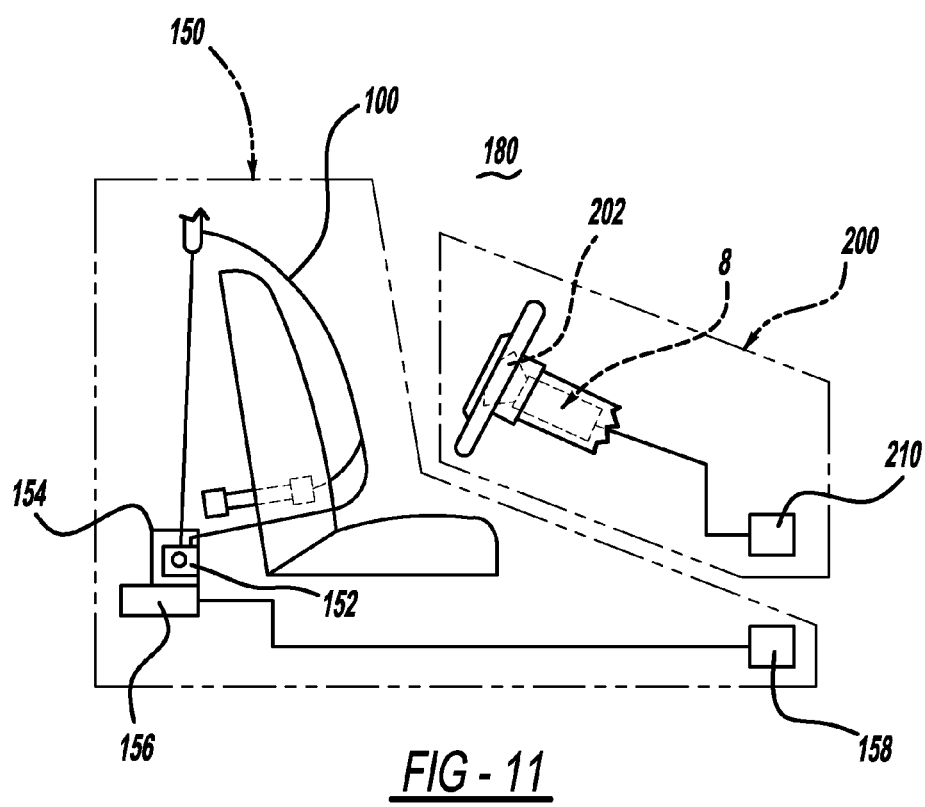
FIG. 11 is a schematic representation of an exemplary vehicle occupant protection system incorporating a gas source in accordance with the present invention.

Referring to FIG. 11, a gas source or gas generating system 8 including an embodiment of the sealing apparatus described herein may be incorporated into an airbag system 200. Airbag system 200 includes at least one airbag 202 and a gas source 8 coupled to airbag 202 so as to enable fluid communication with an interior of the airbag. Airbag system 200 may also incorporate (or be in communication with) a crash event sensor 210 including a known crash sensor algorithm that signals actuation of airbag system 200 via, for example, activation of igniter 66 in the event of a collision.

Referring again to FIG. 11, a gas source or gas generating system including an embodiment of the sealing apparatus described herein may be incorporated into a broader, more comprehensive vehicle occupant restraint system 180 including additional elements such as a safety belt assembly 150, as seen in FIG. 11. Safety belt assembly 150 includes a safety belt housing 152 and a safety belt 160 in accordance with the present invention extending from housing 152. A safety belt retractor mechanism 154 (for example, a spring-loaded mechanism) may be coupled to an end portion 153 of the belt. In addition, a safety belt pretensioner 156 may be coupled to belt retractor mechanism 154 to actuate the retractor mechanism in the event of a collision. Typical seat belt retractor mechanisms which may be used in conjunction with the safety belt embodiments of the present invention are described in U.S. Pat. Nos. 5,743,480, 5,553,803, 5,667,161, 5,451,008, 4,558,832 and 4,597,546, incorporated herein by reference. Illustrative examples of typical pretensioners with which the safety belt embodiments of the present invention may be combined are described in U.S. Pat. Nos. 6,505,790 and 6,419,177, incorporated herein by reference.

Safety belt system 150 may incorporate (or be in communication with) a crash event sensor 158 (for example, an inertia sensor or an accelerometer) including a known crash sensor algorithm that signals actuation of belt pretensioner 156 via, for example, activation of a pyrotechnic igniter (not shown) incorporated into the pretensioner. U.S. Pat. Nos. 6,505,790 and 6,419,177, previously incorporated herein by reference, provide illustrative examples of pretensioners actuated in such a manner.

It will be understood that the foregoing description of the present invention is for illustrative purposes only, and that the various structural and operational features herein disclosed are susceptible to a number of modifications, none of which departs from the spirit and scope of the present invention. The preceding description, therefore, is not meant to limit the scope of the invention. Rather, the scope of the invention is to be determined only by the appended claims and their equivalents.

What is claimed is:

1. An apparatus comprising:
a seal member including a base, a wall extending from a circumference of the base, and a flange extending from a circumference of the wall, the wall including a rupturable portion and a second wall portion extending between the rupturable portion and the base; and
a support structure for supporting the seal member adjacent the rupturable portion, wherein the second wall portion is spaced apart from the support structure.

2. The apparatus of claim 1 wherein the seal member extends along an axis, and wherein the support structure is positioned to substantially prevent outward bulging of the portion of the seal member in a direction substantially transverse to the axis.

3. The apparatus of claim 1 wherein the seal member extends along a passage formed in a housing, and wherein the support structure comprises a portion of the housing.

4. The apparatus of claim 1 further comprising a third wall portion extending between the rupturable portion and the flange, and wherein the support structure is positioned for supporting the third wall portion.

5. The apparatus of claim 1 wherein the seal member is structured such that a pressure within a predetermined range acting on the seal member produces a deformation of the wall second portion toward the support structure sufficient to rupture the wall along the rupturable portion.

6. A source of pressurized fluid for actuating a fluid-actuatable element, comprising:
a container for storing the fluid under pressure; and
an apparatus in accordance with claim 1 operatively coupled to the container for releasably blocking a flow of pressurized fluid from the container.

7. A gas generating system, comprising:
a container for storing a fluid under pressure; and
an apparatus in accordance with claim 1 operatively coupled to the container for releasably blocking a flow of pressurized fluid from the container.

8. A vehicle occupant protection system including an apparatus in accordance with claim 1.

9. An apparatus comprising:
a seal member including a rupturable portion; and
a support structure for supporting the seal member adjacent the rupturable portion along a first side thereof,
wherein the seal member is unsupported by the support structure adjacent the rupturable portion along a second side of the rupturable portion opposite the first side.

10. The apparatus of claim 9 wherein the support structure also supports the seal member along a part of the rupturable portion.

11. The apparatus of claim 9 further comprising a third wall portion extending between the rupturable portion and the flange, and wherein the support structure is positioned for supporting the third wall portion.

\* \* \* \* \*